United States Patent Office 3,396,167
Patented Aug. 6, 1968

3,396,167
ISOCYANURATE PRODUCTION
Alwyn G. Davies, London, England, assignor to M. & T. Chemicals Inc., New York, N.Y., a corporation of Delaware
No Drawing. Filed Sept. 10, 1965, Ser. No. 486,561
7 Claims. (Cl. 260—248)

ABSTRACT OF THE DISCLOSURE

In accordance with certain of its aspects, the process of this invention for preparing isocyanurates comprises condensing at least one organic isocyanate in the presence of an organotin compound $R_3SnOR'$ wherein R is selected from the group consisting of alkyl, aryl, and alkenyl and R' is selected from the group consisting of alkyl, aryl, alkenyl, hydrogen, and —$SnR_3$ thereby forming said isocyanurate; and recovering said isocyanurate.

---

This invention relates to a process for preparing organic isocyanurates.

Isocyanurates are compounds which have found use as intermediates, sanitizing agents, bleaches and the like. No completely satisfactory method for preparing isocyanurates has heretofore been known. Methods previously employed may require an extensive period of time and high temperature to obtain complete reaction. Further, products obtained by prior methods may be contaminated with by-products such as carbamates. Moreover, many potentially desirable isocyanurates have not been capable of preparation by prior art techniques. Unsymmetrical isocyanurates have been especially difficult to prepare.

It is an object of this invention to provide a novel process for preparing isocyanurates. It is a further object to provide novel isocyanurates. Other objects will be apparent to those skilled in the art from the following description.

In accordance with certain of its aspects, the process of this invention for preparing isocyanurates comprises condensing at least one organic isocyanate in the presence of an organotin compound $R_3SnOR'$ wherein R is selected from the group consisting of alkyl, aryl, and alkenyl and R' is selected from the group consisting of alkyl, aryl, alkenyl, hydrogen, and —$SnR_3$ thereby forming said isocyanurate; and recovering said isocyanurate.

The organic isocyanates which may be used in the practice of this invention may typically be monoisocyanates having the structure R"—N=C=O wherein R" may be selected from the group consisting of alkyl, aryl and alkenyl. For example, R" may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cyclohexyl, cycloheptyl, cyclooctyl, etc. R" may be aryl, including phenyl, naphthyl, anthryl, phenanthryl, etc. R" may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R" may also be an inertly substituted radical of the type hereinbefore described. Typical inert substituents which may be present include alkyl, cycloalkyl, aralkyl, alkaryl, alkenyl, ether, halogen, etc. Typical substituted alkyls include trichloromethyl, 3-chloropropyl, 2-ethoxyethyl, benzyl, 4-methylcyclohexyl, β-phenylethyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. Preferably, R" may be phenyl, naphthyl, or lower alkyl, i.e. alkyl containing less than about 10 carbon atoms.

Illustrative isocyanates which may be used include methyl isocynate, ethyl isocyanate, n-propyl isocyanate, isopropyl isocyanate, n-butyl isocyanate, sec-butyl isocyanate, isobutyl isocyanate, n-octyl isocyanate, phenyl isocyanate, 1-naphthyl isocyanate, vinyl isocyanate, allyl isocyanate, 3-butenyl isocyanate, cyclohexyl isocyanate, benzyl isocyanate, p-tolyl isocyanate, etc. Where these compounds are not readily available, they may be prepared by converting the corresponding carboxylic acid to an azide and then heating the azide in an inert solvent thereby forming the isocyanate in accordance with the Curtius rearrangement thus:

$$R''COOH \rightarrow R''CON_3 \rightarrow R''—N=C=O$$

The isocyanates may also be prepared by reacting an organic sulfate with potassium cyanate thus:

$$R''_2SO_4 + KNCO \rightarrow R''KSO_4 + R''NCO$$

or by reacting a primary amine with phosgene thus $$R''NH_2 + COCl_2 \rightarrow R''NCO + 2HCl$$

In accordance with this invention, isocyanates may be prepared by condensing at least one isocyanate in the presence of an organotin compound of the formula $$R_3SnOR'$$

wherein R is selected from the group consisting of alkyl, aryl, and alkenyl, and R' is selected from the group consisting of alkyl, aryl, alkenyl, and —$SnR_3$. For example, R may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, cyclooctyl, etc. R may be aryl, including phenyl, naphthyl, anthryl, phenanthryl, etc. R may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R may also be an inertly substituted radical of the type hereinbefore described. Typical inert substituents which may be present include alkyl, cycloalkyl, alkaryl, alkenyl, ether, halogen, etc. Typical substituted alkyls include trichloromethyl, 3-chloropropyl, 2-ethoxethyl, benzyl, 4-methylcyclohexyl, 4-chlorocyclohexyl, β-phenylethyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. All of the R groups need not be the same. Preferably, R may be phenyl or lower alkyl, i.e. alkyl containing less than about 10 carbon atoms.

R' may be any of the alkyl, aryl, or alkenyl radicals described for R. R' may also be $R_3Sn$—wherein R has the meaning hereinbefore given, and $R_3SnOR'$ may thus be $R_3SnOSnR_3$ or $(R_3Sn)_2O$.

$R_3SnOR'$ may be a triorganotin alkoxide or aryloxide, such as trimethyltin methoxide, triethyltin ethoxide, tri-n-propyltin ethoxide, triisopropyltin methoxide, tri-n-butyltin methoxide, tri-n-butyltin ethoxide, tri-n-propyltin phenoxide, tri-n-butyltin phenoxide, triphenyltin 2-ethylhexoxide, triethyltin phenoxide, tritolyltin isopropoxide, tribenzyltin methoxide, tri-n-butyltin benzoxide, etc.

$R_3SnOR'$ may be a bis(triorganotin) oxide such as bis(triethyltin) oxide, bis(tri-n-propyltin) oxide, bis(triisopropyltin) oxide, bis(tri-n-butyltin) oxide, bis(triphenyltin) oxide, bis(tricyclohexyltin) oxide, etc.

The process of this invention may be generally represented as the condensation of 3 moles of isocyanate to form one mole of isocyanurate in the presence of R₃SnOR', as shown in Equation I.

(I)
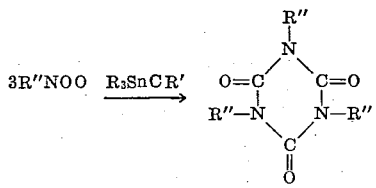

More precisely, it has been found that the reaction apparently may proceed in a step-wise manner, the individual steps being represented by Equations II, III, IV, and V.

(II)

(III)
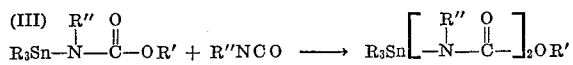

(IV)
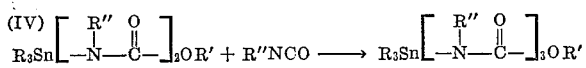

(V)
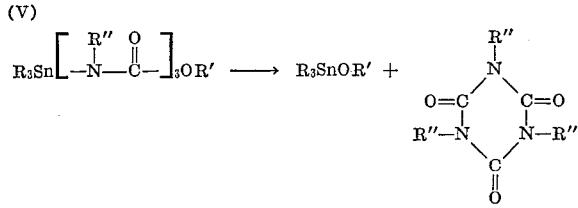

As may be seen from these equations, the organotin compound is regenerated in reaction V and is thus available for further reaction. Accordingly, if the desired isocyanurate is a symmetrical compound wherein all of the R'' groups are the same, the organotin compound may be employed in essentially catalytic amount as well as in greater amounts, typically 0.05–2 moles per mole of isocyanate and preferably 0.1–1, say 0.2 mole per mole of isocyanate. In accordance with this embodiment of the invention, symmetrical isocyanurates may be efficiently prepared.

It is a particular feature of this invention that it provides a highly convenient technique for preparing unsymmetrical isocyanurates containing different groups. Prior methods have been restricted to procedures wherein only very specific types of unsymmetrical isocyanurates could be prepared such prior methods have co-trimerized mixed isocyanurates thereby producing a mixture of isocyanurates thereby producing a mixture of isocyanurates. Separation of desired unsymmetrical isocyanurates was difficult.

For example, the process may be controlled at the level of Equation II by using about one mole of R₃SnOR' per mole of isocyanate. It may also be desirable to add the isocyanate incrementally to the R₃SnOR' in order to prevent local excesses of isocyanate. The product of Equation II may then be obtained and further reacted with a second isocyanate according to Equation III, IV, and V to produce an unsymmetrical isocyanurate wherein two of the R'' groups are derived from the second isocyanate. Similarly, the process may be controlled at the level of Equation III by using about 2 moles of the first isocyanate per mole of R₃SnOR'. The product of Equation III may then be reacted with a second isocyanate to produce the desired isocyanurate having two R'' groups derived from the first isocyanate and one R'' group derived from the second isocyanate.

It may also be possible to prepare unsymmetrical isocyanurates wherein all three R'' groups are different. For example, about equimolar amounts of a first isocyanate may be reacted with R₃SnOR' to give the product of Equation II. This product may be recoverd and reacted with a second isocyanate. Preferably, the second isocyanate may be added incrementally to the product of Equation II and a slight molar deficiency of the second isocyanate may be employed, to give the product of Equation III, which product may be reacted with a third isocyanate according to Equations IV and V to give the unsymmetrical isocyanurate having three different R'' groups.

The reactions of this invention typically take place under moderate conditions. Reaction temperatures of about 0° C.–200° C. are generally suitable and temperatures of about 10° C.–100° C. may be preferred. Reaction times are typically of the order of 0.5–500 hours, say 12–36 hours. Because of the reactive nature of the isocyanates and the intermediates present in the process of this invention, it is highly desirable to exclude from the reaction mixture all compounds which have a reactive hydrogen atom, i.e. compounds having active hydrogen atoms as determined by the Zerewitinoff determination.

Typical isocyanurates which may be formed according to certain aspects of this invention include:

Trimethyl isocyanurate
Triethyl isocyanurate
Tripropyl isocyanurate
Tributyl isocyanurate
Tri-2-ethylhexyl isocyanurate
Triphenyl isocyanurate
Tri-1-naphthyl isocyanurate
Dimethyl-1-ethyl isocyanurate
Dimethyl-phenyl isocyanurate
Diethyl-phenyl isocyanurate
Methyl-diphenyl isocyanurate Practice of this invention may be observed from inspection of the following illustrative examples. All parts except where otherwise indicated are by weight.

Example 1

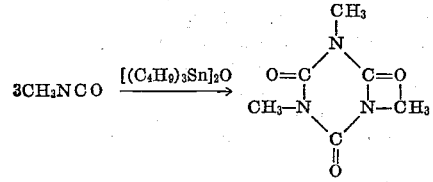

2.28 parts of bis(tributyltin) oxide may be added to 7.0 parts of methyl isocyanate and cooled in ice for 10 minutes to moderate the initial exothermic reaction. Reaction may then continue at 20° C. and cyclic trimer may begin to separate after 19 hours; after 62 hours the mixture may solidify and the odor of the isocyanate become no longer apparent. The product trimethyl isocyanurate may then be washed with cyclohexane and recrystallized from acetone. The product may be found to have a melting point of 180° C. and be identical in melting point, infrared spectrum, and nuclear magnetic resonance spectrum with the product obtained after a four week reaction between 1 mole of 4-dimethylamino pyridine and 32 moles of methyl isocyanate at 20° C.

Example 2

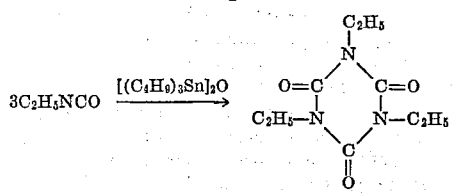

0.2 part of bis(tri-n-butyltin) oxide may be added to 2 parts of ethyl isocyanate at room temperature. After 25 days the infrared spectrum may indicate a decay in the band typical of the isocyanate at 4.4 microns and the presence of triethyl isocyanurate by a considerable number of new bands, particularly a broad intense one of 5.7–6.2 microns. Triethyl isocyanurate may be separated from volatiles with a rotary pump, leaving a white waxy solid, which recrystallizes from benzene and has a melting point of about 93.5° C.

Example 3

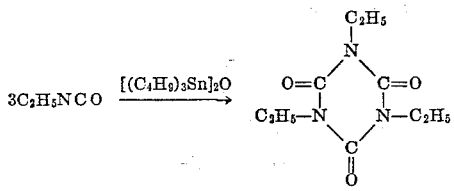

Triethyl isocyanurate may also be prepared by addition of 0.685 part of ethyl isocyanate to 2.906 parts of bis (tri-n-butyltin) oxide. The infrared peak characteristic of the isocyanurate at 5.9 microns may appear after 2 hours and reaction may be complete in 10 days. After separating and washing the product triethyl isocyanurate with pentane, a melting point of about 95° C. may be found.

Example 4

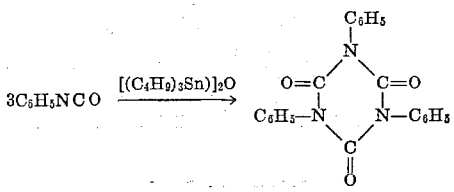

2 parts of phenyl isocyanate may be mixed with 0.2 part of bis(tri-n-butyltin) oxide. Crystals may start to separate after 7 days and after 12 days, product triphenyl isocyanurate may be washed with dry pentane and found to have a melting point of about 293.5° C.

Example 5

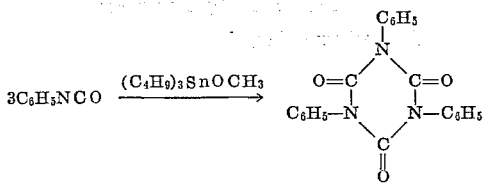

Triphenyl isocyanurate may alternatively be prepared by reacting a mixture of 2 parts of phenyl isocyanate and 0.2 part of tributyltin methoxide. Colorless crystal of triphenyl isocyanurate may be filtered off and washed with pentane after 7 days. The product may be shown to have a melting point of 293°–295° C. and an infrared spectrum identical to that of the product of Example 4.

Example 6

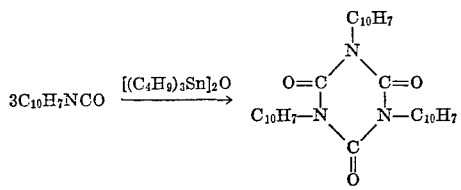

0.3 part of bis(tri-n-butyltin) oxide may be added to a solution of 4 parts of 1-naphthyl isocyanate in 5 parts of pentane. Crystals of tri-n-naphthyl isocyanurate may separate after 22 days and may be filtered off, washed with light petroleum, and shown to decompose at 339°–342° C.

Example 7

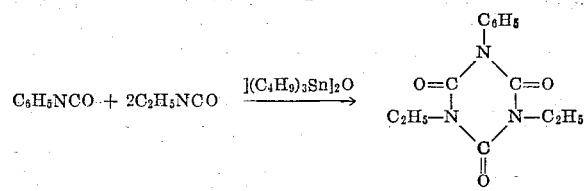

2.936 parts of bis(tri-n-butyltin) oxide and 0.595 part of phenyl isocyanate may be mixed, providing an exothermic reaction. After cooling, 0.39 part of ethyl isocyanate may be added. At this point the infrared spectrum may indicate an admixture of ethyl isocyanate and N,O-bis-(tri-n-butyltin)-N-phenyl carbamate,

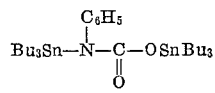

After 10 days some ethyl isocyanate may still be present, but new infrared peaks at 5.95 microns and 13.1 microns may be observed. After 28 days of reaction, the solution may be refrigerator cooled and crystals may be filtered off, washed with pentane, and recrystallized from benzene. The melting point of the product may be determined to be 95°–97.5° C.

Example 8

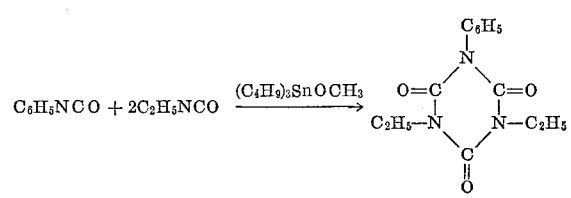

Diethyl-phenyl isocyanurate may also be prepared by first forming methyl N-phenyl-N-tributyltin carbamate,

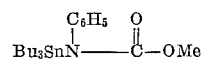

from 0.047 part of phenyl isocyanate and 0.128 part of tributyltin methoxide, and then cooling and adding 0.097 part of ethyl isocyanate to 0.175 part of the carbamate. The decay of the isocyanate band at 4.4 microns and the growth of the isocyanurate band at 5.95 microns may be observed on the infrared spectrum. To separate solid diethyl-phenyl isocyanurate, 2 parts of pentane may be added and the reaction vessel refrigerator-cooled. The solid may be filtered off, washed with pentane and recrystallized. The product may be found to have a melting point of 94.5°–97° C. and the infrared spectrum found to be identical to that of the product of Example 7.

Example 9

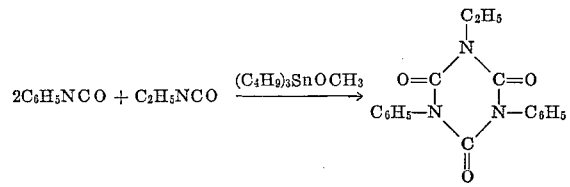

0.58 part of phenyl isocyanate may be added to 2.098 parts of methyl N-tributyltin-N-ethyl carbamate,

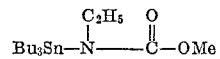

which may be formed from 0.380 part of ethyl isocyanate and 1.718 parts of tributyltin methoxide. The carbamate adduct may be cooled before adding the phenyl isocyanate. After 23 hours, a small amount of crystalline solid may separate and the infrared spectrum may show that all isocyanates had reacted. A considerable amount of crystalline solid may form during the next 6 hours. 5 cc. of pentane may then be added, the solid filtered off, washed and dried. The product ethyl-diphenyl isocyanurate may be found to have a melting point of 156.5°–159° C. and to have been obtained in 67% yield.

Although this invention has been disclosed by reference to various specific examples, it will be apparent to those skilled in the art that various modifications and changes may be made thereto which fall within the scope of this invention.

I claim:

1. The process for preparing isocyanurates comprising condensing at least one organic isocyanate in the presence of an organotin compound $R_3SnOR'$ wherein R is selected from the group consisting of alkyl, aryl, and alkenyl and R' is selected from the group consisting of alkyl, aryl, alkenyl, and $-SnR_3$ thereby forming said isocyanurate, and recovering said isocyanurate.

2. The process for preparing isocyanurates comprising condensing at least one monoisocyanate having the structure $R''-N=C=O$, wherein R'' is selected from the group consisting of alkyl, aryl, and alkenyl, in the presence of an organotin compound $R_3SnOR'$ wherein R is selected from the group consisting of alkyl, aryl, and alkenyl and R' is selected from the group consisting of alkyl, aryl, alkenyl, and $-SnR_3$ thereby forming said isocyanurate, and recovering said isocyanurate.

3. The process for preparing isocyanurates which comprises reacting a first monoisocyanate R''NCO wherein R'' is selected from the group consisting of alkyl, aryl, and alkenyl, with an organotin compound $R_3SnOR'$ wherein R is selected from the group consisting of alkyl, aryl, and alkenyl and R' is selected from the group consisting of alkyl, aryl, alkenyl, and $SnR_3$ thereby forming

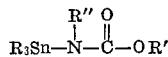

reacting said

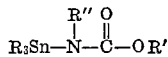

with a second monoisocyanate R''NCO thereby forming

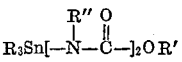

and reacting said $$R_3Sn[-N(R'')-C(O)-]_2OR'$$

with a third monoisocyanate R''NCO thereby forming product isocyanurate

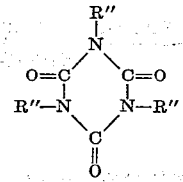

and regenerating $R_3SnOR'$; and recovering said isocyanurate.

4. The process claimed in claim 3 wherein said first monoisocyanate, said second monoisocyanate and said third monoisocyanate are the same.

5. The process as claimed in claim 4 wherein said same monoisocyanate is 1-naphthyl isocyanate.

6. The process claimed in claim 3 wherein said second monoisocyanate and said third monoisocyanate are different from said first monoisocyanate.

7. The process claimed in claim 3 wherein said second monoisocyanate and said third monoisocyanate are the same as each other and are different than said first monoisocyanate.

References Cited

UNITED STATES PATENTS

| | | | |
|---|---|---|---|
| 3,217,003 | 11/1965 | Ellzey et al. | 260—248 |
| 3,322,761 | 5/1967 | Little | 260—248 |
| 3,278,492 | 10/1966 | Herbstman | 260—248 |
| 2,993,870 | 7/1961 | Burkus | 260—248 XR |
| 3,326,906 | 6/1967 | Stamm | 260—248 XR |

JOHN D. RANDOLPH, *Primary Examiner.*

J. M. FORD, *Assistant Examiner.*